US009951268B2

(12) United States Patent
Singh et al.

(10) Patent No.: US 9,951,268 B2
(45) Date of Patent: Apr. 24, 2018

(54) WELLBORE SERVICING MATERIALS AND METHODS OF MAKING AND USING SAME (71) Applicant: Halliburton Energy Services, Inc., Houston, TX (US)

(72) Inventors: Dipti Singh, Kingwood, TX (US); B. Raghava Reddy, The Woodlands, TX (US); Jeremy Holtsclaw, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 47 days.

(21) Appl. No.: 15/187,518

(22) Filed: Jun. 20, 2016

(65) Prior Publication Data
US 2016/0298028 A1 Oct. 13, 2016

Related U.S. Application Data (62) Division of application No. 13/856,734, filed on Apr. 4, 2013, now Pat. No. 9,399,729.

(51) Int. Cl.
| C09K 8/40 | (2006.01) |
| C09K 8/575 | (2006.01) |
| C09K 8/03 | (2006.01) |
| C09K 8/44 | (2006.01) |
| C09K 8/90 | (2006.01) |
| C09K 8/68 | (2006.01) |

(52) U.S. Cl.
CPC ............... *C09K 8/905* (2013.01); *C09K 8/03* (2013.01); *C09K 8/40* (2013.01); *C09K 8/44* (2013.01); *C09K 8/5758* (2013.01); *C09K 8/685* (2013.01); *C09K 2208/26* (2013.01)

(58) Field of Classification Search
None
See application file for complete search history.

(56) References Cited

U.S. PATENT DOCUMENTS

| 4,144,179 | A | 3/1979 | Chatterji |
| 5,783,527 | A | 7/1998 | Dobson, Jr. et al. |
| 6,422,314 | B1 * | 7/2002 | Todd ........................ C09K 8/08 166/300 |
| 6,793,018 | B2 | 9/2004 | Dawson et al. |
| 6,983,801 | B2 | 1/2006 | Dawson et al. |

(Continued)

FOREIGN PATENT DOCUMENTS

| WO | 2010113094 A1 | 10/2010 |
| WO | WO2010113094 A1 | 10/2010 |

OTHER PUBLICATIONS

International Search Report and Written Opinion, PCT/ US2014/ 032569, dated Sep. 25, 2014, 18 pages.

(Continued)

Primary Examiner — John J Figueroa
(74) Attorney, Agent, or Firm — Craig Roddy; Baker Botts L.L.P.

(57) ABSTRACT

Wellbore servicing fluid are provided that comprise a viscosifying polymeric material, a breaking agent comprising an inorganic peroxide of a divalent metal M(II) characterized by the general formula $MO_2$, and a break rate controlling additive comprising a M(II) soluble salt, a M(II) precipitating salt, a M(II) surface precipitating salt, a M(II) solution precipitating salt, or combinations thereof.

12 Claims, 5 Drawing Sheets (56) References Cited

U.S. PATENT DOCUMENTS

| | | |
|---|---|---|
| 7,427,582 B2 | 9/2008 | Ballard et al. |
| 7,621,335 B2 | 11/2009 | Valeriano et al. |
| 7,857,048 B2 | 12/2010 | Daniel et al. |
| 7,921,909 B2 | 4/2011 | Daniel et al. |
| 7,989,404 B2 | 8/2011 | Kakadjian et al. |
| 8,066,058 B2 | 11/2011 | Daniel et al. |
| 8,183,186 B2 | 5/2012 | Luo et al. |
| 8,387,696 B2 | 3/2013 | Prasek et al. |
| 2006/0116296 A1* | 6/2006 | Kippie ............... C09K 8/12 507/244 |
| 2009/0200033 A1 | 8/2009 | Kakadjian et al. |
| 2011/0152133 A1 | 6/2011 | Sanders et al. |
| 2012/0000652 A1 | 1/2012 | Jones et al. |
| 2012/0111564 A1 | 5/2012 | Reddy et al. |
| 2012/0190595 A1 | 7/2012 | Welton et al. |
| 2012/0325482 A1 | 12/2012 | Salgaonkar et al. |

OTHER PUBLICATIONS

International Preliminary Report on Patentability issued in related PCT Application No. PCT/US2014/032569 dated Oct. 15, 2015, 14 pages.

Foreign communication from a related counterpart application—Invitation to Pay Additional Fees, PCT/US2014/032569, dated Jun. 24, 2014, 5 pages.

International Search Report and Written Opinion issued in related PCT Application No. PCT/US2014/032569 dated Sep. 25, 2014, 18 pages.

\* cited by examiner

Figure 5

WELLBORE SERVICING MATERIALS AND METHODS OF MAKING AND USING SAME

CROSS-REFERENCE TO RELATED APPLICATIONS

This is a divisional of and claims priority to U.S. application Ser. No. 13/856,734 filed on Apr. 4, 2013, the entirety of which is incorporated herein by reference.

STATEMENT REGARDING FEDERALLY SPONSORED RESEARCH OR DEVELOPMENT

Not applicable.

BACKGROUND

This disclosure relates to methods of servicing a wellbore. More specifically, it relates to servicing a wellbore with viscosified treatment fluids and breaker compositions.

Natural resources (e.g., oil or gas) residing in the subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a viscosified treatment fluid (e.g., a viscosified fracturing fluid) may be pumped down the wellbore at a rate and a pressure sufficient to form fractures that extend into the formation, providing additional pathways through which the oil or gas can flow to the well.

A variety of other viscosified treatment fluids besides viscosified fracturing fluids may also be used in subterranean applications, such as for example drilling fluids and gravel packing fluids. Oftentimes, after the viscosified treatment fluid has performed its desired task, it may be desirable (for example, in order to minimize or eliminate any damage to the formation permeability due to polymer penetration) to reduce its viscosity (e.g., "break" the fluid) so that the treatment fluid can be recovered from the formation and/or particulate matter may be dropped out of the treatment fluid at a desired location within the formation.

Internal breakers, such as enzymes, oxidizers, acids, or temperature-activated viscosity reducers, can be used to reduce the viscosity of viscosified treatment fluids. Unfortunately, these traditional breakers may result in an incomplete and/or premature viscosity reduction. Premature viscosity reduction is undesirable as it may lead to, inter alia, particulates settling out of the fluid in an undesirable location and/or at an undesirable time. Moreover, conventional non-delayed breakers begin to reduce the viscosity of the viscosified fluid upon addition and continue to reduce the viscosity of the fluid with time until the fluid is completely broken or until the breaker is expended. Since the breaking activity begins immediately, it is common practice to start with excess viscosifier to offset the point at which the viscosity falls below an acceptable level. Using excess viscosifier is not only an added material expense, it also may lead to increased or excessive friction pressure during treatment placement, thereby further increasing the required pumping capacity and associated operating expense. Alternately, encapsulated breakers may be used to control the release rate of breaker. Such options, however, add to material costs.

As an alternative to using traditional breakers, breaking a viscosified treatment fluid may also be accomplished using just time and/or temperature. The viscosity of most treatment fluids will reduce naturally if given enough time and at a sufficient temperature. However, such methods generally are not practical as it is highly desirable to return the well back to production as quickly as possible, as opposed to waiting for the viscosity of a treatment fluid to naturally decrease over time. The task of breaking the viscosified treatment fluids is also a problem at many of the lower temperature wells (e.g., bottom hole temperatures of about 130° F. or lower). Catalysis of the breakers (e.g., breaker activation) is often employed to improve breaking of the fluid, but finding a suitable formulation that meets all performance criteria is often a challenge. Thus an ongoing need exists for improved compositions and methods of breaking viscosified treatment fluids.

SUMMARY

Disclosed herein is a method of servicing a wellbore in a subterranean formation comprising placing a wellbore servicing fluid in the wellbore and/or subterranean formation, wherein the wellbore servicing fluid comprises a viscosifying polymeric material, a breaking agent comprising an inorganic peroxide of a divalent metal M(II) characterized by the general formula $MO_2$, and a break rate controlling additive comprising a M(II) soluble salt, a M(II) precipitating salt, a M(II) surface precipitating salt, a M(II) solution precipitating salt, or combinations thereof, allowing the wellbore servicing fluid to break, and flowing back to the surface at least a portion of the broken wellbore servicing fluid.

Also disclosed herein is a method of servicing a wellbore in a subterranean formation comprising placing a wellbore servicing fluid in the wellbore and/or the subterranean formation, wherein the wellbore servicing fluid comprises a viscosifying polymeric material, a breaking agent and a rate controlling additive, wherein the viscosifying polymeric material comprises a guar-based polymer crosslinked with a polyacrylamide bound borate crosslinker, the breaking agent comprises $MgO_2$, and the rate controlling additive comprises a Mg(II) soluble salt, allowing the wellbore servicing fluid to break, and flowing back to the surface at least a portion of the broken wellbore servicing fluid.

Further disclosed herein is a method of servicing a wellbore in a subterranean formation comprising placing a wellbore servicing fluid in the wellbore and/or subterranean formation, wherein the wellbore servicing fluid comprises a viscosifying polymeric material, a breaking agent and a rate controlling additive, wherein the viscosifying polymeric material comprises a guar crosslinked with a polyacrylamide bound borate crosslinking agent, the breaking agent comprises $MgO_2$, and the rate controlling additive comprises sodium polyphosphate, allowing the wellbore servicing fluid to break, and flowing back to the surface at least a portion of the broken wellbore servicing fluid.

Further disclosed herein is an aqueous based wellbore servicing fluid comprising a viscosifying polymeric material, a breaking agent comprising an inorganic peroxide of a divalent metal M(II) characterized by the general formula $MO_2$, and a rate controlling additive comprising a M(II) soluble salt, a M(II) precipitating salt, a M(II) surface precipitating salt, a M(II) solution precipitating salt, or combinations thereof.

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids (WSFs) or compositions and methods of using same. In an embodiment, the wellbore servicing fluid is a viscosified WSF and may comprise a viscosifying polymeric material; an optional crosslinker; and a breaker or a breaking agent (BA) and a breaker rate controlling additive (BRCA), collectively referred to herein as BA/BRCA or a BA/BRCA combination. Utilization of a viscosified WSF comprising a viscosifying polymeric material and a BA/BRCA in the methods disclosed herein may advantageously facilitate breaking of the viscosified WSF at the end of the wellbore servicing operation performed by placing the viscosified WSF downhole. Reducing the viscosity of a viscosified WSF is often referred to as "breaking" the fluid.

In an embodiment, the viscosified WSF comprises a viscosifying polymeric material. Without wishing to be limited by theory, the polymeric material imparts an increased viscosity to the WSF. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Examples of polymeric materials suitable for use as part of the viscosifying polymeric material include, but are not limited to homopolymers, random, block, graft, star- and hyper-branched polyesters, copolymers thereof, derivatives thereof, or combinations thereof. The term "derivative" herein is defined to include any compound that is made from one or more of the viscosifying polymeric materials, for example, by replacing one atom in the viscosifying polymeric material with another atom or group of atoms, rearranging two or more atoms in the viscosifying polymeric material, ionizing one of the viscosifying polymeric material, or creating a salt of one of the viscosifying polymeric material. The term "copolymer" as used herein is not limited to the combination of two monomers, but includes any combination of any number of monomers to form terpolymers, quaterpolymers, and the like. The term "copolymer" also includes polymers with any connectivity among the monomers to provide polymers with any regio-, stereo-, or architectural molecular structures (e.g., graft polymers, block polymers, dendritic polymers, and the like).

In an embodiment, the viscosifying polymeric material is comprised of a naturally-occurring material. Alternatively, the viscosifying polymeric material comprises a synthetic material. Alternatively, the viscosifying polymeric material comprises a mixture of a naturally-occurring and synthetic material.

In an embodiment, the viscosifying polymeric material may be used in uncrosslinked form. In an alternative embodiment, the viscosifying polymeric material may be a crosslinked polymer.

Nonlimiting examples of viscosifying polymeric materials suitable for use in the present disclosure include polysaccharides, guar, locust bean gum, Karaya gum, gum tragacanth, hydroxypropyl guar (HPG), carboxymethyl guar (CMG), carboxymethyl hydroxypropyl guar (CMHPG), hydrophobically modified guars, high-molecular weight polysaccharides composed of mannose and galactose sugars, heteropolysaccharides obtained by the fermentation of starch-derived sugars, xanthan, diutan, welan, gellan, scleroglucan, chitosan, dextran, substituted or unsubstituted galactomannans, starch, cellulose, cellulose ethers, carboxycelluloses, carboxymethyl cellulose (CMC), hydroxyethyl cellulose (HEC), hydroxypropyl cellulose, carboxyalkylhydroxyethyl celluloses, carboxymethyl hydroxyethyl cellulose (CMHEC), methyl cellulose, polyacrylic acid (PAC), sodium polyacrylate, polyacrylamide (PAM), partially hydrolyzed polyacrylamide (PHPA), polymethacrylamide, poly(acrylamido-2-methyl-propane sulfonate), poly (sodium-2-acrylamide-3-propylsulfonate), polyvinyl alcohol, copolymers of acrylamide and acrylamido-2-methyl-propane sulfonate, terpolymers of acrylamido-2-methyl-propane sulfonate, acrylamide and vinylpyrrolidone or itaconic acid, derivatives thereof, and the like, or combinations thereof. Such materials may be used in solid form, as oil suspensions and/or as water-in-oil emulsions. Viscosifying polymeric materials suitable for use in the present disclosure are described in more detail in U.S. Publication No. 2012/0325482 A1, 2012/0190595 A1, 2012/0111564 A1, 2011/0152133 A1, and U.S. Pat. No. 4,144,179; each of which is incorporated by reference herein in its entirety.

Nonlimiting examples of viscosifying polymeric materials suitable for use in this disclosure include LGC-VI gelling agent, WG-31 gelling agent, WG-35 gelling agent, WG-36 gelling agent, or combinations thereof. LGC-VI gelling agent is an oil suspension of a guar-based gelling agent specifically formulated for applications that require a superconcentrated slurry; WG-31, WG-35, and WG-36 gelling agents are guar-based gelling agents used as solids; each of which is commercially available from Halliburton Energy Services.

In an embodiment, the viscosifying polymeric materials may be included within the WSF in a suitable amount. In an embodiment a viscosifying polymeric materials of the type disclosed herein may be present within the WSF in an amount of from about 0.01 wt. % to about 15 wt. %, alternatively from about 0.1 wt. % to about 10 wt. %, or alternatively from about 0.4 wt. % to about 5 wt. %, based on the total weight of the WSF.

In an embodiment, the WSF further comprises a crosslinker. Without wishing to be limited by theory, a crosslinker is a chemical compound or agent that enables or facilitates the formation of crosslinks, i.e., bonds that link polymeric chains to each other, with the end result of increasing the molecular weight of the polymer. When a fluid comprises a polymer (e.g., a viscosifying polymeric material), crosslinking such polymer generally leads to an increase in fluid viscosity (e.g., due to an increase in the molecular weight of the polymer), when compared to the same fluid comprising the same polymer in the same amount, but without being crosslinked. The presence of a crosslinker in a WSF comprising a viscosifying polymeric material may lead to a crosslinked fluid. For example, if the viscosity of the WSF comprising a viscosifying polymeric materials is x, the viscosity of the crosslinked fluid may be at least about 2x, alternatively about 10x, alternatively about 20x, alternatively about 50x, or alternatively about 100x. Crosslinked fluids are thought to have a three dimensional polymeric structure that is better able to support solids, such as for example proppants, gravel packs, etc., when compared to the same WSF comprising the same polymer in the same amount, but without being crosslinked.

Nonlimiting examples of crosslinkers suitable for use in the present disclosure include polyvalent metal ions, aluminum ions, zirconium ions, titanium ions, antimony ions, polyvalent metal ion complexes, aluminum complexes, zirconium complexes, titanium complexes, antimony complexes, and boron compounds, borate, borax, boric acid, calcium borate, magnesium borate, borate esters, polyborates, polymer bound boronic acid, polymer bound borate, polyacrylamide bound borate, and the like, or combinations thereof.

Examples of commercially available crosslinkers include BC-140 crosslinker; BC-200 crosslinker; CL-23 crosslinker; CL-24 crosslinker; CL-28M crosslinker; CL-29 crosslinker; CL-31 crosslinker; CL-36 crosslinker; K-38 crosslinker; or combinations thereof. BC-140 crosslinker is a specially formulated crosslinker/buffer system; BC-200 crosslinker is a delayed crosslinker that functions as both crosslinker and buffer; CL-23 crosslinker is a delayed crosslinking agent that is compatible with $CO_2$; CL-24 crosslinker is a zirconium-ion complex used as a delayed temperature-activated crosslinker; CL-28M crosslinker is a water-based suspension of a borate mineral; CL-29 crosslinker is a fast acting zirconium complex; CL-31 crosslinker is a concentrated solution of non-delayed borate crosslinker; CL-36 crosslinker is a mixed metal crosslinker; K-38 crosslinker is a borate crosslinker; all of which are available from Halliburton Energy Services, Inc., Houston, Tex.

In an embodiment, the crosslinker may be included within the WSF in a suitable amount. In an embodiment a crosslinker of the type disclosed herein may be present within the WSF in an amount of from about 10 parts per million (ppm) to about 500 ppm, alternatively from about 50 ppm to about 300 ppm, or alternatively from about 100 ppm to about 200 ppm, based on the total weight of the WSF.

In an embodiment, the steady shear viscosity or viscosity of a viscosified WSF suitable for use in this disclosure may be in the range of from about 50 cP to about 5000 cP, alternatively from about 100 cP to about 3000 cP, or alternatively from about 400 cP to about 1500 cP, at a shear rate of 40 $s^{-1}$, as measured by a rheometer (e.g., on a Chandler 5550 viscometer).

The WSF further comprises a BA and a breaker rate controlling additive (BRCA). Chemicals used to reduce the viscosity of the viscosified WSF are called breakers or breaking agents. Reducing the viscosity of the viscosified WSF is referred to as "breaking" the fluid, for example by breaking or reversing of the crosslinks between polymer molecules and/or by reducing the size of the polymer chains by chain scission of the viscosifying polymeric materials. No particular mechanism is necessarily implied by the term "breaking." In an embodiment, the viscosified WSF comprises a peroxide and a BRCA. In an embodiment, the viscosified WSF comprises an inorganic peroxide and a BRCA.

In an embodiment, the BA comprises an inorganic peroxide of a divalent metal M(II) characterized by the general formula $MO_2$, where M may comprise Mg, Ca, Zn, Ba, and the like. Nonlimiting examples of BAs suitable for use in the present disclosure include $MgO_2$, $CaO_2$, $ZnO_2$, $BaO_2$, and the like, or combinations thereof. The inorganic peroxide of a divalent metal M(II) suitable for use as BAs in the present disclosure may be in the form of peroxides, peroxyhydrates, peroxyhydroxy hydrates, or combinations thereof. Additional disclosure regarding the use of inorganic peroxides as breakers may be found in U.S. Pat. No. 7,427,582, which is incorporated by reference herein in its entirety.

In an embodiment, the inorganic peroxide suitable for use as a BA in this disclosure is sparingly soluble or slightly soluble in water. Without wishing to be limited by theory, a "sparingly soluble" chemical compound (e.g., inorganic peroxide) refers to a chemical compound that is partially (not completely) soluble in water, and consequently it is possible to establish an equilibrium between dissolved ions and undissolved chemical compound. The water solubility of a chemical compound may be expressed in g/L (e.g., grams of chemical compound that dissolves in 1 L of water) or mol/L (e.g., moles of chemical compound that dissolves in 1 L of water), at a specific temperature. For the purposes of this disclosure, solubility of a compound is described by different descriptive terms as shown in Table 1, where the solubility values are given for room temperature.

TABLE 1

| Descriptive term | Parts of solvent per 1 part solute (weight basis) | % Solubility in water when water is the solvent (g/100 g water) |
|---|---|---|
| Very soluble | Less than about 1 | Greater than about 100 |
| Freely soluble | From about 1 to about 10 | From about 10 to about 100 |
| Soluble | From about 10 to about 30 | From about 3.3 to about 10 |
| Sparingly soluble | From about 30 to about 100 | From about 1 to about 3 |
| Slightly soluble | From about 100 to about 1000 | From about 0.1 to about 1 |
| Very slightly soluble | From about 1000 to about 10000 | From about 0.01 to about 0.1 |
| Practically insoluble or insoluble | Greater than about 10000 | Less than about 0.01 |

Further, without wishing to be limited by theory, a sparingly or slightly soluble ionic compound may be characterized by a solubility product or a solubility product constant ($K_{sp}$). In very general terms, the solubility product of a compound is a specialized type of equilibrium constant, which represents the product of the concentration of the ions that are present in a saturated solution of an ionic compound.

For the purposes of this disclosure, the $K_{sp}$ for an inorganic peroxide of a divalent metal M(II) characterized by the general formula $MO_2$ is directly proportional with the molar concentration of the divalent cations $M^{2+}$ in the solution. Without wishing to be limited by theory, when the product of the molar concentrations of the constituent ions in solution (e.g., $M^{2+}$) for a particular chemical compound has a value that exceeds the $K_{sp}$ value for that particular chemical compound, the chemical compound will precipitate.

In an embodiment, the inorganic peroxide suitable for use as a BA in this disclosure has a $K_{sp}$ value in the range of from about $1 \times 10^{-2}$ to about $1 \times 10^{-40}$, alternatively from about $1 \times 10^{-5}$ to about $1 \times 10^{-30}$, or alternatively from about $1 \times 10^{-2}$ to about $1 \times 10^{-10}$. Alternatively, the solubility product of a BA is less than about $1 \times 10^{-2}$, alternatively less than about $1 \times 10^{-5}$, or alternatively less than about $1 \times 10^{-10}$.

In an embodiment, the BA may be included within the WSF in a suitable amount. In an embodiment a BA of the type disclosed herein may be present within the WSF in an amount of from about 0.1 pounds per thousand gallons (pptg) to about 50 pptg, alternatively from about 1 pptg to about 25 pptg, or alternatively from about 2 pptg to about 20 pptg, based on the volume of the WSF.

In an embodiment, the viscosified WSF comprises a break rate controlling additive (BRCA), for example in combination with a BA such as an inorganic peroxide. The BRCA may comprise a material that functions to modify/alter the rate of breaking of a viscosified WSF, for example the rate of breaking of a viscosified WSF by an inorganic peroxide. In an embodiment, the BRCA controls the rate of dissolution of the inorganic peroxide employed as the breaking agent. In an embodiment, the BRCA comprises a soluble salt of the divalent metal M(II), designated herein as "M(II) soluble salt", corresponding to the divalent metal M(II) from the peroxide BA used in a particular application. In an alternative embodiment, the BRCA comprises a precipitating salt for the divalent metal M(II), designated herein as "M(II) precipitating salt", corresponding to the divalent metal M(II) from the peroxide BA used in a particular application.

In an embodiment, the BRCA comprises a M(II) soluble salt, corresponding to the divalent metal M(II) from the peroxide BA used in a particular application. For example, if $MgO_2$ is used as the BA in a particular application, a Mg(II) soluble salt may be used as the M(II) soluble salt. The BA/BRCA used for a particular application, where BA comprises divalent metal M(II) peroxide and BRCA comprises a M(II) soluble salt, will comprise the same divalent metal M(II) in each the BA and the BRCA. Further, $M^{2+}$ is also called the "common ion" for the divalent metal M(II) peroxide and the M(II) soluble salt.

For the purposes of this disclosure, the M(II) soluble salt has a water solubility of greater than about 30 g/L, alternatively greater than about 100 g/L, or alternatively greater than about 1000 g/L, where the solubility values are given for room temperature.

Without wishing to be limited by theory, when two compounds (e.g., a divalent metal M(II) peroxide and a M(II) soluble salt) containing a common ion (e.g., $M^{2+}$) are dissolved in the same aqueous solution, a "common ion effect" can be observed. The common ion effect is responsible for the reduction in solubility of a sparingly soluble chemical compound (e.g., a sparingly soluble divalent metal M(II) peroxide) when a soluble compound (e.g., a M(II) soluble salt) containing one of the constituent ions (e.g., $M^{2+}$) of the sparingly soluble chemical compound is added to the solution. As the concentration of the common ion (e.g., $M^{2+}$) is increased, the excess ions (e.g., $M^{2+}$) would precipitate out as the sparingly soluble chemical compound, according to Le Chatelier's principle. For the purposes of this disclosure, when a BA comprising a divalent metal M(II) peroxide and a BRCA comprising a M(II) soluble salt are added to the same solution, it is believed that the BRCA controls the rate of breaking the viscosified WSF by reducing the solubility of the divalent metal M(II) peroxide, and consequently slowing down the rate of breaking the viscosified WSF.

Nonlimiting examples of M(II) soluble salts suitable for use in the present disclosure include $MgCl_2$, $MgBr_2$, $MgI_2$, $MgSO_4$, $CaCl_2$, $CaBr_2$, $CaI_2$, $ZnCl_2$, $ZnBr_2$, $ZnI_2$, $BaCl_2$, $BaBr_2$, $BaI_2$, $SrCl_2$, $SrBr_2$, $SrI_2$; $Mg(acetate)_2$, $Mg(NO_3)_2$, $Ca(acetate)_2$, $Ca(NO_3)_2$, $Ba(acetate)_2$, $Ba(NO_3)_2$, $Sr(acetate)_2$, $Sr(NO_3)_2$, and the like, or combinations thereof.

In an embodiment, the BRCA comprises a M(II) precipitating salt, corresponding to the divalent metal M(II) from the peroxide BA used in a particular application. Without wishing to be limited by theory, a M(II) precipitating salt does not contain the divalent metal M(II), but it contains an anion that forms an insoluble precipitate with $M^{2+}$ ions found in solution. Such insoluble precipitate formed by the anion of the M(II) precipitating salt with the $M^{2+}$ ions will be referred to herein as "M(II) precipitated salt." For example, if $MgO_2$ is used as the BA in a particular application, a Mg(II) precipitating salt (e.g., a salt having an anion that forms an insoluble precipitate with $Mg^{2+}$, such as for example phosphate) may be used as the M(II) precipitating salt. The BA/BRCA used for a particular application, where BA comprises divalent metal M(II) peroxide and BRCA comprises a M(II) precipitating salt, will comprise or refer the same divalent metal M(II) in each the BA and the BRCA.

For the purposes of this disclosure, the M(II) precipitating salt has a water solubility of greater than about 30 g/L, alternatively greater than about 100 g/L, or alternatively greater than about 1000 g/L, where the solubility values are given for room temperature.

Without wishing to be limited by theory, in order for the anion of the M(II) precipitating salt to form an insoluble precipitate with the $M^{2+}$ ions found in solution, the solubility product of the BA has to be greater than the solubility product of the M(II) precipitated salt.

In an embodiment, the M(II) precipitated salt may form in the solution. In such embodiment, when the M(II) precipitated salt forms, it depletes the $M^{2+}$ ions from the solution, and more of the $MO_2$ will go into solution thereby increasing the amount of $[O_2]^{2-}$ species, in an attempt to replenish the precipitated $M^{2+}$ ions such that requirements for $K_{sp}$ of $MO_2$ are reestablished. For the purposes of this disclosure, a M(II) precipitating salt that leads to the formation of the M(II) precipitated salt in solution is designated herein as "M(II) solution precipitating salt." When a BA comprising a divalent metal M(II) peroxide and a BRCA comprising a M(II) solution precipitating salt are added to the same solution, it is believed that the BRCA controls the rate of breaking the viscosified WSF by promoting increased amounts of the $MO_2$ to go in solution, and consequently increasing the amount of $[O_2]^{2-}$ species, which accelerates the rate of breaking the viscosified WSF.

In an embodiment, the M(II) precipitated salt may form on the surface of the $MO_2$. In such embodiment, when the M(II) precipitated salt forms, it hinders the dissolution of the $MO_2$. For the purposes of this disclosure, a M(II) precipitating salt that leads to the formation of M(II) precipitated salt on the surface of the $MO_2$ is designated herein as "M(II) surface precipitating salt." When a BA comprising a divalent metal M(II) peroxide and a BRCA comprising a M(II) surface precipitating salt are added to the same solution, it is believed that the BRCA controls the rate of breaking the viscosified WSF by decreasing the amount of the $MO_2$ going into the solution, and consequently decreases the rate of breaking the viscosified WSF.

In an embodiment, the M(II) precipitated salt has a $K_{sp}$ value of less than about $1\times10^{-2}$, alternatively less than about $1\times10^{-10}$, or alternatively less than about $1\times10^{-30}$, while meeting the requirement that $K_{sp(M(II)\ precipitated\ salt)} < K_{sp(MO_2)}$.

As will be appreciated by one of skill in the art, with the help of this disclosure, the choice of the M(II) precipitating salt for a particular application depends on the divalent metal M(II) from the $MO_2$ used in that particular application as a BA, and on the type of precipitate it forms (e.g., solution precipitate or surface precipitate). For example, if the BA comprises $BaO_2$, then the M(II) precipitating salt may comprise sodium sulfate, since barium sulfate that would form as the Ba precipitated salt is insoluble. The use of a sulfate salt as the M(II) precipitating salt would not work as well in the case of $MgO_2$ and $ZnO_2$, for example, because magnesium sulfate and zinc sulfate are soluble salts and would not precipitate out.

As will be appreciated by one of skill in the art, with the help of this disclosure, the M(II) solution precipitating salt may also form some precipitate on the surface of the $MO_2$, and the M(II) surface precipitating salt may also form some precipitate in the solution. In some embodiments, a M(II) precipitating salt may be a M(II) solution precipitating salt, while in other embodiments, the same M(II) precipitating salt may be a M(II) surface precipitating salt.

Nonlimiting examples of M(II) precipitating salts suitable for use in the present disclosure include phosphates, such as sodium phosphate, potassium phosphate, hydrogen phosphates, sodium hydrogen phosphate, potassium hydrogen phosphate, dihydrogen phosphates, sodium dihydrogen phosphate, and potassium dihydrogen phosphate; polyphosphates such as sodium polyphosphate, potassium polyphosphate, and sodium hexametaphosphate; carbonates such as sodium carbonate, and potassium carbonate; sulfates such as sodium sulfate and potassium sulfate; organic phosphates, organic phosphonates, organic carboxylates, fatty acid carboxylates, oxalates; and the like, or combinations thereof. Organic phosphates, organic phosphonates, and organic carboxylates generally comprise organic compounds that may contain specific functional groups (e.g., phosphate, phosphonate, carboxylate, sulfonates, etc.). Organic phosphates, organic phosphonates, and organic carboxylates may also include polymers or oligomers containing such functional groups (e.g., phosphate, phosphonate, carboxylate, sulfonates, etc.) or containing small molecules (e.g., surfactants) comprising these functional groups (e.g., phosphate, phosphonate, carboxylate, sulfonates, etc.).

In an embodiment, the BRCA may be included within the WSF in a suitable amount. In an embodiment a BRCA of the type disclosed herein may be present within the WSF in an amount of from about 1 pptg to about 200 pptg, alternatively from about 2 pptg to about 100 pptg, or alternatively from about 5 pptg to about 50 pptg, based on the volume of the WSF. In an embodiment the molar ratio of [$MO_2$]/[M(II) precipitating salt] is greater than about 0.01, alternatively greater than about 0.5, or alternatively greater than about 1.

In an embodiment, the WSF is an aqueous based fluid. Aqueous base fluids that may be used in the WSF include any aqueous fluid suitable for use in subterranean applications, provided that the aqueous base fluid is compatible with the other components of the WSF (e.g., the viscosifying polymeric material, crosslinker (when present), BA and BRCA). For example, the WSF may comprise water or a brine. In an embodiment, the base fluid comprises an aqueous brine. In such an embodiment, the aqueous brine generally comprises water and an inorganic monovalent salt, an inorganic multivalent salt that does not contain the common M(II) ion or the precipitating anion, or both. The aqueous brine may be naturally occurring or artificially-created. Water present in the brine may be from any suitable source, examples of which include, but are not limited to, sea water, tap water, freshwater, produced water, or combinations thereof. In an embodiment the water used to make up WSF may be treated with water softening agents to reduce the amounts of M(II) divalent ions, and M(II) precipitating anions. The salt or salts in the water may be present in an amount ranging from greater than about 0% by weight to a saturated salt solution, alternatively from about 1% to about 20%, or alternatively from about 2% to about 7%. In an embodiment, the salt or salts in the water may be present within the base fluid in an amount sufficient to yield a saturated brine.

Nonlimiting examples of aqueous brines suitable for use in the present disclosure include chloride-based, bromide-based, or formate-based brines containing monovalent and/or polyvalent cations, salts of alkali and alkaline earth metals (excluding "common ion" containing M(II) alkaline earth metals), or combinations thereof. Additional examples of suitable brines include, but are not limited to: NaCl, NaBr, sodium formate, potassium formate, cesium formate, calcium bromide (when $M(II)O_2$ is not $CaO_2$), $ZnBr_2$ (when $M(II)O_2$ is not $ZnO_2$), or combinations thereof. In an embodiment, the aqueous fluid comprises a brine. The brine may be present in an amount of from about 40 wt. % to about 99.7 wt. %, alternatively from about 50 wt. % to about 99 wt. %, or alternatively from about 70 wt. % to about 95 wt. %, based on the total weight of the WSF. Alternatively, the aqueous fluid may comprise the balance of the WSF after considering the amount of the other components used.

The viscosified WSF may further comprise additional additives as deemed appropriate for improving the properties of the fluid. Such additives may vary depending on the intended use of the fluid in the wellbore. Examples of such additives include, but are not limited to, emulsifiers, lime, organic/inorganic viscosifiers, gelling agents, weighting agents, glass fibers, carbon fibers, suspending agents, conditioning agents, dispersants, water softeners, oxidation and corrosion inhibitors, thinners, acid gas scavengers, proppants, gravel, or combinations thereof. These additives may be introduced singularly or in combination using any suitable methodology and in amounts effective to produce the desired improvements in fluid properties.

In an embodiment, an aqueous-based, viscosified WSF comprises a viscosifying polymeric material comprising a guar-based gelling agent, a BA comprising $MgO_2$, and a BRCA comprising $MgCl_2$ as the M(II) soluble salt (e.g., soluble Mg(II) salt). In an embodiment, the viscosified WSF further comprises a borate crosslinker. In such embodiment, $MgCl_2$ is added to the viscosified WSF first, followed by the addition of the $MgO_2$. The presence of the M(II) soluble salt (e.g., soluble Mg(II) salt) may delay the breaking of the viscosified WSF by about 1 h.

In another embodiment, an aqueous-based, viscosified WSF comprises a viscosifying polymeric material comprising a guar-based gelling agent, a BA comprising $MgO_2$, and a BRCA comprising sodium polyphosphate as the M(II) solution precipitating salt (e.g., Mg(II) ion solution precipitating salt). In an embodiment, the viscosified WSF further comprises a borate crosslinker. In such embodiment, $MgO_2$ is added to the viscosified WSF first, followed by the addition of sodium polyphosphate. The presence of the Mg(II) solution precipitating salt may accelerate the breaking of the viscosified WSF by about 1 h.

In another embodiment, an aqueous-based, viscosified WSF comprises a viscosifying polymeric material comprising a guar-based gelling agent, a BA comprising $MgO_2$, and a BRCA comprising $Na_3PO_4$ as the Mg(II) surface precipitating salt. In an embodiment, the viscosified WSF further comprises a borate crosslinker. In such embodiment, $MgO_2$ is added to the viscosified WSF first, followed by the addition of $Na_3PO_4$. The presence of the Mg(II) surface precipitating salt may delay the rate of breaking the viscosified WSF by about 1 h.

In yet another embodiment, an aqueous-based, viscosified WSF comprises a borate crosslinker that is bound to an acrylamide polymer (e.g., polyacrylamide bound borate), a guar-based viscosifying polymer, a BA comprising $MgO_2$, and a BRCA comprising $MgCl_2$ as the Mg(II) soluble salt. In such embodiment, $MgCl_2$ is added to the viscosified WSF first, followed by the addition of the $MgO_2$. The presence of the Mg(II) soluble salt may delay the breaking of the viscosified WSF by about 1 h.

In still yet another embodiment, an aqueous-based, viscosified WSF comprises a borate crosslinker that is bound to an acrylamide polymer (e.g., polyacrylamide bound borate), a guar-based viscosifying polymer, a BA comprising $MgO_2$, and a BRCA comprising sodium polyphosphate as the Mg(II) solution precipitating salt. In such embodiment, $MgO_2$ is added to the viscosified WSF first, followed by the addition of sodium polyphosphate. The presence of the Mg(II) solution precipitating salt may accelerate the breaking of the viscosified WSF by about 1 h.

In still yet another embodiment, an aqueous-based, viscosified WSF comprises a borate crosslinker that is bound to an acrylamide polymer (e.g., polyacrylamide bound borate), a guar-based viscosifying polymer, a BA comprising $MgO_2$, and a BRCA comprising $Na_3PO_4$ as the Mg(II) surface precipitating salt. In such embodiment, $MgO_2$ is added to the viscosified WSF first, followed by the addition of $Na_3PO_4$. The presence of the Mg(II) surface precipitating salt may delay the rate of breaking the viscosified WSF by about 1 h.

A viscosifying polymeric material, optional crosslinker, and BA/BRCA of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids, gravel packing fluids, diverting fluids or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the WSF may be prepared via any suitable method or process. The components of the WSF (e.g., the viscosifying polymeric material, optional crosslinker, and BA/BRCA) may be combined and mixed in by using any mixing device compatible with the composition.

In an embodiment, the BRCA comprises a M(II) soluble salt. In such embodiment, the BRCA may be added first to one or more components of the WSF (e.g., an existing aqueous based WSF), and the BA comprising a $MO_2$ may be added second to the WSF. The addition of the sparingly soluble divalent metal peroxide to a solution that already contains the common metal ions may lead to a slowed down rate of breaking the viscosified WSF, as previously described herein.

In an alternative embodiment, the BRCA comprises a M(II) precipitating salt. In such embodiment, the BA comprising a $MO_2$ may be added first to one or more components of the WSF (e.g., an existing aqueous based WSF), and the BRCA may be added second to the WSF. The addition of a M(II) precipitating salt comprising a M(II) solution precipitating salt to a solution that already contains the sparingly soluble divalent metal peroxide may lead to an accelerated rate of breaking the viscosified WSF, as previously described herein. Alternatively, the addition of a M(II) precipitating salt comprising a M(II) surface precipitating salt to a solution that already contains the sparingly soluble divalent metal peroxide may lead to a decreased rate of breaking the viscosified WSF, as previously described herein.

In an embodiment, the viscosifying polymeric material and the BA/BRCA combination may be added to the same WSF and delivered into the wellbore as a single stream WSF. In an embodiment, the BA and the BRCA are manufactured off-site. In an alternative embodiment, the BA and the BRCA are manufactured at the well site. In another embodiment, either the BA or the BRCA is preformed and the other one would be made on-the-fly (e.g., in real time or on-location), and the two materials would then be added to the WSF on-the-fly. When manufactured or assembled off site, the BA and/or BRCA may be transported to the well site and combined with the other components to form a WSF.

In an embodiment, the BRCA comprises a M(II) soluble salt. In an embodiment, the WSF comprising the M(II) soluble salt may be manufactured at the well site. In an alternative embodiment, WSF comprising the M(II) soluble salt may be manufactured off-site. In another embodiment, either the WSF or the BRCA is preformed and the other one would be made on-the-fly (e.g., in real time or on-location), and the two materials would then be mixed together on-the-fly. When manufactured or assembled off site, the WSF and/or BRCA may be transported to the well site and combined with the other components to form a WSF.

When it is desirable to prepare a WSF of the type disclosed herein (i.e., a viscosified WSF) for use in a wellbore, a base (e.g., non-viscosified or under-viscosified) servicing fluid prepared at the wellsite or previously transported to and, if necessary, stored at the on-site location may be combined with the viscosifying polymeric material, additional water and optional other additives to form the viscosified WSF. In an embodiment, additional gelling agents may be added to the viscosified WSF on-the-fly along with the other components/additives. The resulting viscosified WSF may be pumped downhole where it may function as intended (e.g., depositing a proppant and/or a gravel pack in a desired location downhole).

In an embodiment, the BA/BRCA is added to the WSF on-the-fly. The amount of BA and/or BRCA necessary for a particular application may be determined at the well site by lab testing accounting for the wellbore conditions (e.g., bottom hole temperature or BHT, formation water components, etc.).

In an embodiment, the WSF is an aqueous based fracturing fluid comprising a viscosifying polymeric material, optional crosslinker, a BA/BRCA combination, proppant, and an aqueous fluid. In another embodiment, the WSF is an aqueous based gravel packing fluid comprising a viscosifying polymeric material, optional crosslinker, a BA/BRCA combination, gravel, and an aqueous fluid.

In an embodiment, the wellbore service being performed is a fracturing operation, wherein a viscosified WSF is placed (e.g., pumped downhole) in the formation. In such embodiment, the WSF is a fracturing fluid. As will be understood by one of ordinary skill in the art, the particular composition of a fracturing fluid will be dependent on the type of formation that is to be fractured. Fracturing fluids in addition to viscosifying polymeric materials typically comprise an aqueous fluid (e.g., water), a surfactant, a proppant, acid, friction reducers, gelling agents, scale inhibitors, pH-adjusting agents, oxygen scavengers, breakers, crosslinkers, iron-control agents, corrosion inhibitors, bactericides, and the like.

In an embodiment, the fracturing fluid comprises a proppant. In an embodiment, the proppant may comprise any suitable particulate material, which may be used to prop fractures open, i.e., a propping agent or a proppant. As used herein, a proppant refers to a particulate material that is suitable for use in a proppant pack or a gravel pack. When deposited in a fracture, the proppant may form a proppant pack, resulting in conductive channels through which fluids may flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; or combinations thereof. In an embodiment, the proppant comprises sand.

The proppants may be of any suitable size and/or shape. In an embodiment, a proppant suitable for use in the present disclosure may have an average particle size in the range of from about 2 to about 400 mesh, alternatively from about 8 to about 100 mesh, or alternatively about 10 to about 70 mesh, U.S. Sieve Series.

In an embodiment, a proppant may be present in the WSF in an amount of from about 0.1 pounds per gallon (ppg) to about 28 ppg, alternatively from about 0.1 ppg to about 14 ppg, or alternatively from about 0.1 ppg to about 8 ppg, based on the volume of the fracturing fluid.

During well stimulation treatments, such as fracturing treatments, the viscosified treatment fluid (e.g., the fracturing fluid) generally has a viscosity that is sufficient to suspend proppant particles and to place the proppant particles in fractures, inter alia, to maintain the integrity of those fractures once the hydraulic pressure is released. After the proppant is placed in the fracture and pumping stops, the fracture closes. The pores of the proppant bed and the surrounding formation are filled with the fracturing fluid and should be cleaned out to maximize conductivity of the proppant-filled fracture. Once at least one fracture is created and the proppant is substantially in place, the viscosity of the fracturing fluid usually is reduced by breaking the viscosified treatment fluid via function of the BA/BRCA of the type disclosed herein, thereby depositing the proppant and allowing the fluid to be recovered from the formation.

In an embodiment, the wellbore service being performed is a gravel packing operation, wherein a viscosified treatment fluid is placed (e.g., pumped downhole) in the formation. In such embodiment, the WSF is a gravel packing fluid. A "gravel pack" is a term commonly used to refer to a volume of particulate materials (such as gravel and/or sand) placed into a well bore to at least partially reduce the migration of unconsolidated formation particulates into the well bore. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed. In an embodiment, the gravel pack comprises a proppant material of the type previously described herein. Gravel packing is described in more detail in U.S. Pat. No. 8,183,186, which is incorporated by reference herein in its entirety.

During gravel packing treatments, the viscosified treatment fluid (e.g., the gravel packing fluid) generally has a viscosity that is sufficient to suspend gravel pack particles and to place the gravel pack particles in the desired location. Similarly to the proppant, once the gravel pack is substantially in place, the viscosity of the gravel pack fluid often is reduced by breaking the viscosified treatment fluid via function of the BA/BRCA of the type disclosed herein, thereby depositing the gravel and allowing the fluid to be recovered from the formation.

In an embodiment, following a wellbore servicing operation utilizing a viscosified WSF (e.g., a fracturing fluid, a gravel packing fluid, etc.), the wellbore and/or the subterranean formation may be prepared for production, for example, production of a hydrocarbon, therefrom. In an embodiment, preparing the wellbore and/or formation for production may comprise removing the viscosified WSF by allowing the BA/BRCA combination to completely break the viscosified WSF. "Complete breaking" as used herein refers to a phenomenon in which the viscosity of a viscosified WSF is reduced to such a level that the viscosified WSF can be flushed from the formation by flowing formation fluids and returned to the surface and recovered for disposal or reuse. In a laboratory setting, a completely broken fluid has a viscosity of less than about 50 cP, alternatively less than about 40 cP, alternatively less than about 30 cP, alternatively less than about 20 cP, alternatively less than about 10 cP, or alternatively less than about 5 cP, at a shear rate of 40 $s^{-1}$, as measured by rheometry (e.g., on a Fann 35 viscometer).

Without wishing to be limited by theory, inorganic peroxides generally generate free radicals in aqueous solutions. It is thought that such free radicals break the viscosified treatment fluid by degrading the viscosifying polymeric material. Further, without wishing to be limited by theory, free radicals may degrade polymer chains by breaking down polymer chains into smaller fragments and reducing the overall molecular weight of the polymer. This process can occur independently of crosslinks existing between polymer chains.

In an embodiment, the inorganic peroxide of the BA/BRCA is added to the WSF prior to pumping the fluid downhole, or alternatively as the fluid is being pumped downhole. The contacting of the components of the BA/BRCA with the viscosifying polymeric material may initiate the degradation of the polymer by free radicals, although a BRCA is present. The BA/BRCA may be designed so as to produce the free radicals in situ (e.g., within the wellbore) at some user and/or process-desired time point. The presence of the BRCA allows control of the time frame of when the viscosified treatment fluid will reach the point of complete breaking, based on the particular formation conditions (e.g., BHT, pH, formation fluid content, etc.). In an embodiment, it may be desirable to achieve the complete breaking of the fluid within about 24 h from when the wellbore servicing operation utilizing a viscosified treatment fluid (e.g., a fracturing fluid, a gravel packing fluid, etc.) ended, alternatively within about 48 hrs, or alternatively within about 72 hrs.

In an embodiment, the BA/BRCA comprises a M(II) soluble salt and/or M(II) surface precipitating salt and may delay the rate of breaking the viscosified WSF. For example, if the rate of breaking the viscosified WSF is y in the presence of the BA only, the rate of breaking the viscosified WSF viscosity in the presence of the of M(II) soluble salt and/or M(II) surface precipitating salt may be about 0.5y, alternatively about 0.75y, or alternatively about 0.9y. For example, a BA/BRCA comprising a M(II) soluble salt and/or M(II) surface precipitating salt when contacted with a viscosifying polymeric material may result in the degradation of the viscosifying polymeric material in a time frame that is delayed from about 1 hour to about 100 hours, alternatively equal to or greater than about 3 hours, alternatively equal to or greater than about 24 hours, alternatively equal to or greater than about 2 days, when compared to the same breaking agent used in the absence of a BRCA. The extent of the delay may be adjusted by one of ordinary skill in the art with the benefit of this disclosure to meet the needs of the process by adjusting the nature of the BRCA used (e.g., compound type, compound solubility, amounts, etc.).

In an embodiment, the BA/BRCA comprises a M(II) solution precipitating salt and may accelerate the rate of breaking the viscosified WSF. For example, if the rate of breaking the viscosified WSF is z in the presence of the BA only, the rate of breaking the viscosified WSF viscosity in the presence of the of M(II) solution precipitating salt may be about 2z, alternatively about 3z, or alternatively about 10z. For example, a BA/BRCA comprising a M(II) solution precipitating salt when contacted with a viscosifying polymeric material may result in the degradation of the viscosifying polymeric material in a time frame that is accelerated by about 1 hour to about 100 hours, alternatively equal to or greater than about 3 hours, alternatively equal to or greater than about 24 hours, alternatively equal to or greater than about 2 days, when compared to the same breaking agent used in the absence of a BRCA. The extent of the acceleration may be adjusted by one of ordinary skill in the art with the benefit of this disclosure to meet the needs of the process by adjusting the nature of the BRCA used (e.g., compound type, compound solubility, amounts, etc.).

In an embodiment, the BA/BRCA and methods of using the same disclosed herein may be advantageously employed in the performance of one or more wellbore servicing operations. In an embodiment, the rate of breaking a viscosified WSF may be advantageously tailored to provide some user and/or process-desired breaking time. For example, when utilizing a WSF having a BA/BRCA comprising a M(II) soluble salt and/or a M(II) surface precipitating salt, the rate of breaking the WSF may be delayed. Further, when utilizing WSF having a BA/BRCA comprising a M(II) solution precipitating salt, the rate of breaking the WSF may be accelerated.

In an embodiment, the BA/BRCA may advantageously allow for complete breaking of the viscosified WSF and removal of the viscosifying polymeric material and residue thereof from the formation, and may advantageously restore the permeability of the formation to its original level, i.e., the permeability level before the viscosified WSF was employed for a servicing operation in the formation.

In an embodiment, the BA/BRCA may be advantageously used at BHT in the range of from about 60° F. to about 350° F., alternatively from about 140° F. to about 300° F., or from about 160° F. to about 250° F.

In an embodiment, the BA/BRCA may advantageously eliminate the need for encapsulating the breaker, thus providing a versatile, simple and cost effective method for tailoring the breaking time of a viscosified WSF. Additional advantages of the WSF system and/or the methods of using the same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The properties of a viscosifying polymeric material comprising a guar gelling agent were investigated. More specifically the breaking of the guar gelling agent crosslinked with a borate crosslinker comprising multiple borate groups bound to an acrylamide polymer commercially available from Halliburton Energy Services, Inc. under the trade name of FDP S1043 crosslinker was monitored over time, at a constant temperature of 140° F., in the presence of varying amounts of $MgO_2$, and the results are displayed in FIG. 1. For each curve in FIG. 1, a viscosified fluid was prepared by adding 10 pptg guar gelling agent to 50 mL of an aqueous solution with a pH of 10, and crosslinking the polymer by adding 4 gallons per thousand gallons (gptg) of FDP S1043 crosslinker to the polymeric solution of guar gelling agent. Each curve in FIG. 1 corresponds to a different concentration of $MgO_2$ used. In one test, 6 mg $MgO_2$ were added to the 50 mL solution of the crosslinked guar gelling agent, corresponding to a concentration of $MgO_2$ of 1 pptg. Similarly, the other two tests used 12 mg and 24 mg of $MgO_2$ in 50 mL solution, corresponding to concentrations of $MgO_2$ of 2 pptg and 4 pptg, respectively. The viscosity of each solution was monitored over time at a constant shear rate of 40 $s^{-1}$ with a Chandler 5550 rheometer. The sensitivity of this particular rheometer was around 25 cP at 40 $s^{-1}$, meaning that it cannot accurately measure viscosities below about 25 cP. For example, plain water may register a viscosity of about 25 cP at 40 $s^{-1}$.

Figure 1:
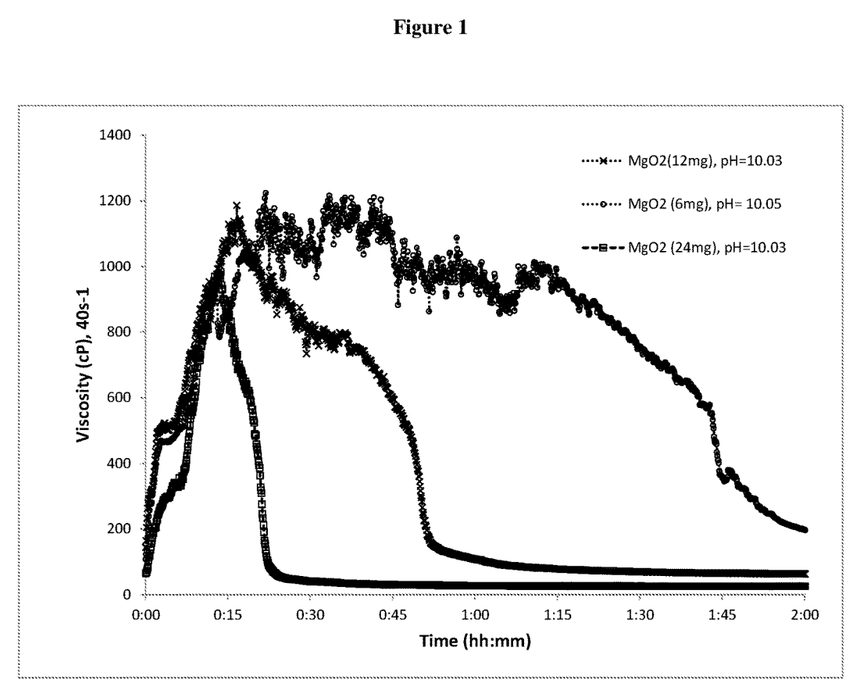
FIG. 1 displays the viscosity variation profile over time for a crosslinked guar polymer in the presence of various breaker concentrations.

FIG. 1 shows the effect of $MgO_2$ concentration on the degradation of guar gelling agent crosslinked polymer.

Increasing amount of $MgO_2$ breaker resulted in faster degradation. Using a lower concentration (e.g., 1 pptg) of $MgO_2$ did not degrade the viscosified solution effectively (broken polymer had viscosity of about 100 cP) and rehealing (e.g., an increase in viscosity) was observed when the solution was cooled after the 2 h test.

Increasing the breaker concentration to 4 pptg has resulted in very fast and effective breaking. The viscosity for the broken gel was ~25 cP. Using 2 pptg of breaker showed a controlled breaking profile but some rehealing character was observed when the solution was cooled after the 2 h test. These results indicate that either quick breaking with higher concentration of $MgO_2$ or delayed less effective breaking with less $MgO_2$ can be achieved. The amounts of magnesium peroxide required to achieve essentially total viscosity reduction of the crosslinked fluids also resulted in shorter breaking durations than would be needed to complete the intended wellbore operation, for example a fracturing operation. Reducing the amounts of magnesium peroxide increased the duration of viscosity retention, but resulted in higher ultimate viscosities than desired for regaining full permeability/conductivity in a subterranean formation setting.

Example 2

The properties of a viscosifying polymeric material comprising a guar gelling agent were investigated. More specifically the breaking of the guar gelling agent crosslinked with FDP S1043 crosslinker was monitored over time in the presence of $MgO_2$, with and without a Mg precipitating salt, at a constant temperature of 140° F., and the results are displayed in FIG. 2. The solutions of crosslinked guar gelling agent were prepared and subjected to rheometry testing as described in Example 1. Both polymer solutions tested for the results in FIG. 2 contained 1 pptg $MgO_2$, i.e., 6 mg $MgO_2$ in 50 mL solution. The difference between the two polymer solutions was that one of the solutions also contained 2 pptg or 12 mg in 50 mL of a sodium polyphosphate salt as the Mg precipitating salt.

Figure 2:
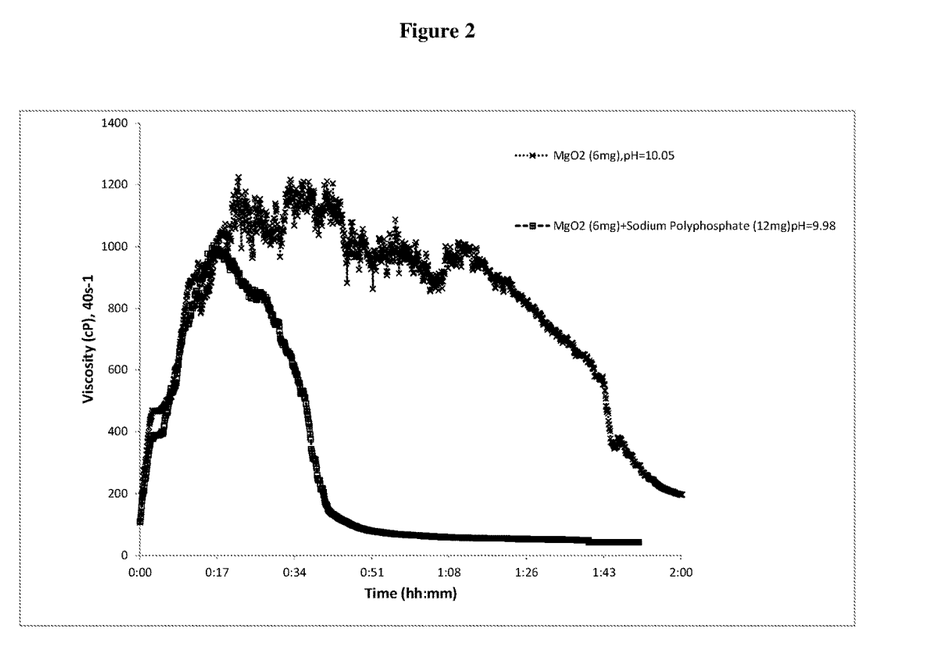
FIGS. 2, 3, 4 and 5 display the viscosity variation profile over time for crosslinked guar polymers in the presence of a breaker and various rate controlling additives.

The addition of sodium polyphosphate has resulted in faster and effective breaking of the viscosified fluids with less rehealing capability for the degraded polymers. FIG. 2 shows that addition of sodium polyphosphate not only expedites the breaking of the viscosified fluids, but also helps in lowering the viscosity to 40 cP, when compared to 100 cP obtained after about 2 h when using only $MgO_2$ as a breaker. This result indicates that the effectiveness of very low levels of magnesium peroxide can be improved significantly, thereby allowing for using small amounts of the breaker which would not result in the premature breaking of the viscosified fluid.

Figure 3:
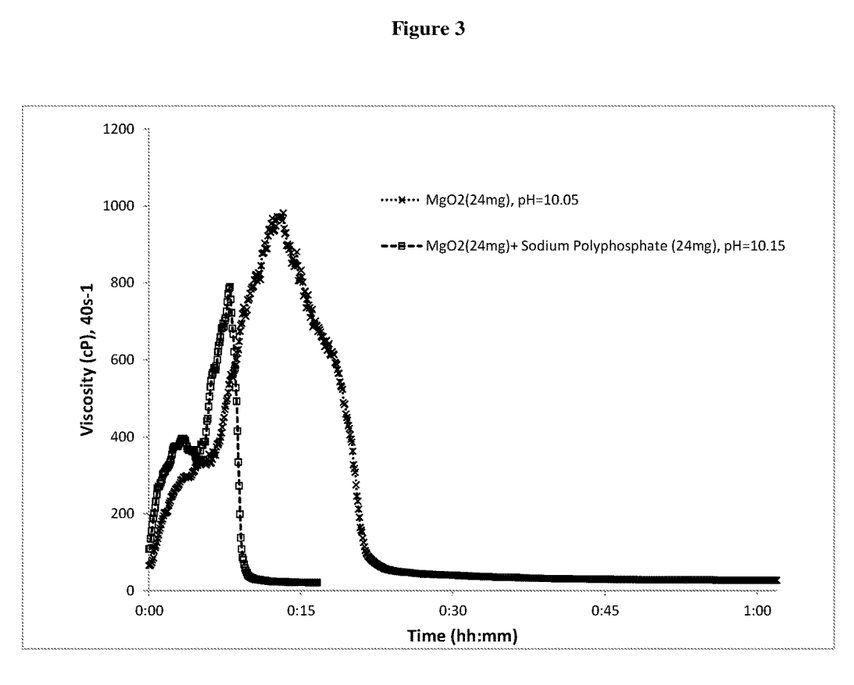

A similar experiment was conducted for a higher concentration of $MgO_2$, specifically for 4 pptg $MgO_2$, i.e., 24 mg $MgO_2$ in 50 mL solution, and the data is displayed in FIG. 3. The amount of sodium polyphosphate used in this case was higher, i.e., 4 pptg or 24 mg sodium polyphosphate in 50 mL solution. The trend was the same as in FIG. 2: the addition of the Mg precipitating salt, e.g., sodium polyphosphate, expedited the breaking of the viscosified fluid.

Example 3

The properties of a viscosifying polymeric material comprising a guar gelling agent were investigated. More specifically the breaking of the guar gelling agent crosslinked with FDP S1043 crosslinker was monitored over time in the presence of $MgO_2$, with and without a Mg soluble salt, at a constant temperature of 140° F., and the results are displayed in FIG. 4. The solutions of crosslinked guar gelling agent were prepared and subjected to rheometry testing as described in Example 1. Both polymer solutions tested for the results in FIG. 4 contained 2 pptg $MgO_2$, i.e., 12 mg $MgO_2$ in 50 mL solution. The difference between the two polymer solutions was that one of the solutions also contained 4 pptg or 24 mg in 50 mL of a Mg soluble salt, $MgCl_2$.

Figure 4:
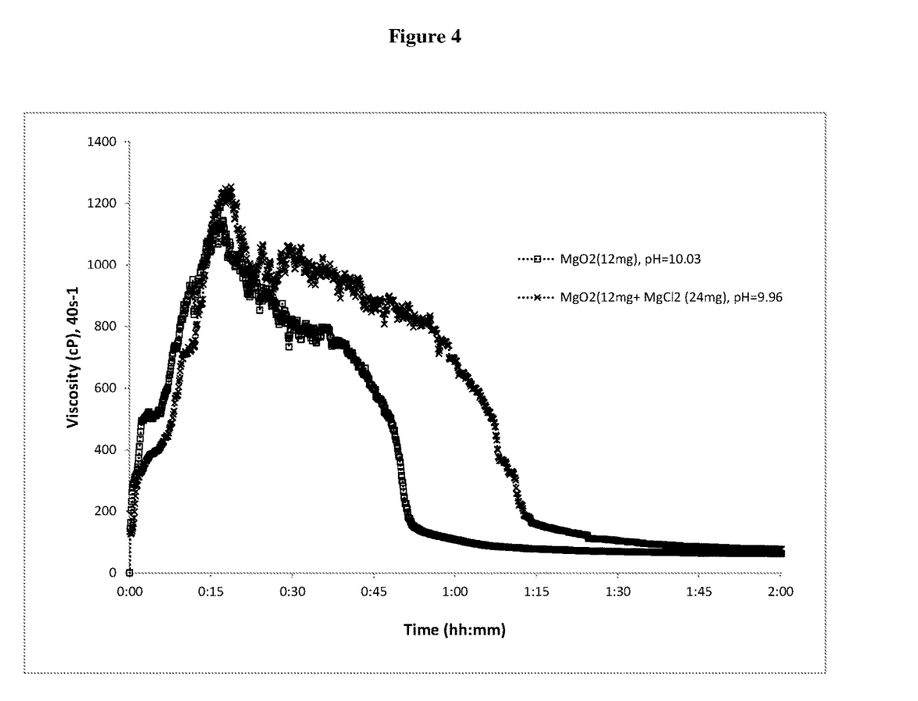

The presence of the Mg soluble salt, $MgCl_2$, decelerated/decreased the rate of viscosity reduction (e.g., breaking) of the viscosified fluid and allowed for using higher levels of magnesium peroxide without otherwise premature breaking of the viscosified fluid.

Example 4

The properties of a viscosifying polymeric material comprising guar gelling agent were investigated. More specifically the breaking of the guar gelling agent crosslinked with FDP S1043 crosslinker was monitored over time in the presence of $MgO_2$, with and without a rate controlling additive, at a constant temperature of 140° F., and the results are displayed in FIG. 5. The solutions of crosslinked guar gelling agent were prepared and subjected to rheometry testing as described in Example 1. All polymer solutions tested for the results in FIG. 5 contained 2 pptg $MgO_2$, i.e., 12 mg $MgO_2$ in 50 mL solution. Of the six solutions tested, one control solution contained no BRCA, and each of the other five solutions contained 4 pptg or 24 mg in 50 mL of a BRCA: sodium polyphosphate, $NaH_2PO_4$, $K_2CO_3$, $Na_2HPO_4$, or $Na_3PO_4$.

Figure 5:
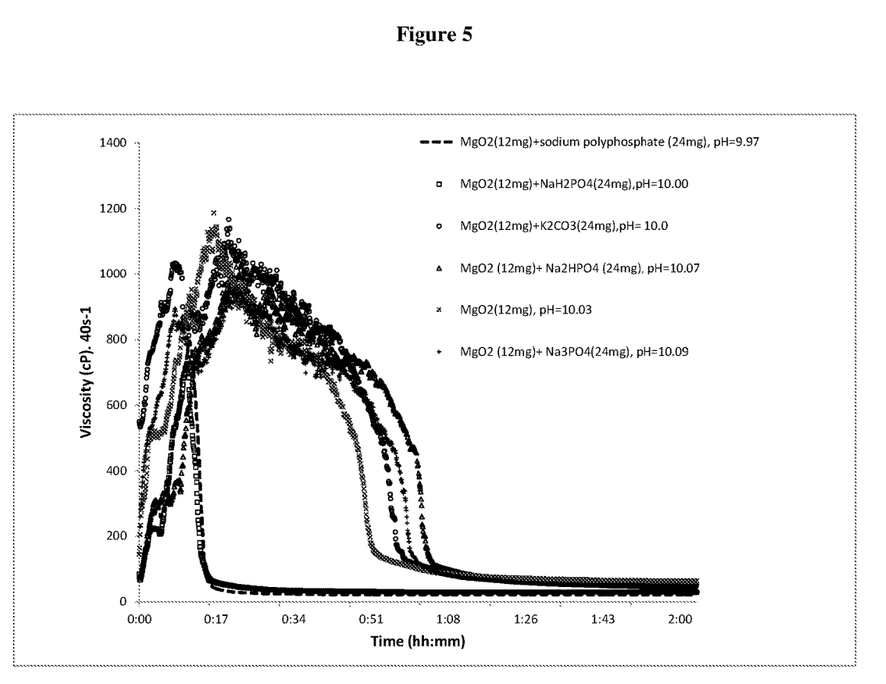

The results displayed in FIG. 5 indicate that the activity of $MgO_2$ can be tailored by addition of various salts and desired breaking time can be obtained. It was found that $NaH_2PO_4$ and sodium polyphosphate work as accelerators for the rate of breakdown induced by $MgO_2$, whereas other salts such as $K_2CO_3$, $Na_2HPO_4$, and $Na_3PO_4$ act as retarders for the rate of breakdown induced by $MgO_2$. While $K_2CO_3$, $Na_2HPO_4$, and $Na_3PO_4$ are Mg(II) precipitating salts, it is possible that the precipitate forms on the surface of the $MgO_2$, and the rate of $MgO_2$ dissolution decreases, leading to a decreased rate of breaking the viscosified fluid, as previously described herein.

Additional Disclosure

A first embodiment, which is a method of servicing a wellbore in a subterranean formation comprising placing a wellbore servicing fluid in the wellbore and/or subterranean formation, wherein the wellbore servicing fluid comprises a viscosifying polymeric material, a breaking agent comprising an inorganic peroxide of a divalent metal M(II) characterized by the general formula $MO_2$, and a break rate controlling additive comprising a M(II) soluble salt, a M(II) precipitating salt, a M(II) surface precipitating salt, a M(II) solution precipitating salt, or combinations thereof, allowing the wellbore servicing fluid to break, and flowing back to the surface at least a portion of the broken wellbore servicing fluid.

A second embodiment, which is the method of the first embodiment wherein the viscosifying polymeric material comprises polysaccharides, guar, locust bean gum, Karaya gum, gum tragacanth, hydroxypropyl guar, carboxymethyl guar, carboxymethyl hydroxypropyl guar, hydrophobically modified guars, high-molecular weight polysaccharides composed of mannose and galactose sugars, heteropolysaccharides obtained by the fermentation of starch-derived sugars, xanthan, diutan, welan, gellan, scleroglucan, chitosan, dextran, substituted or unsubstituted galactomannans, starch, cellulose, cellulose ethers, carboxycelluloses, carboxymethyl cellulose, hydroxyethyl cellulose, hydroxypropyl cellulose, carboxyalkylhydroxyethyl celluloses, carboxymethyl hydroxyethyl cellulose, methyl cellulose, polyacrylic acid, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), polyvinyl alcohol, copolymers of acrylamide and acrylamido-2-methyl-propane sulfonate, terpolymers of acrylamido-2-methyl-propane sulfonate, acrylamide and vinylpyrrolidone or itaconic acid, derivatives thereof, and the like, or combinations thereof.

A third embodiment, which is the method of one of the first through second embodiments wherein the viscosifying polymeric material is present in the wellbore servicing fluid in an amount of from about 0.01 wt. % to about 15 wt. %, based on the total weight of the wellbore servicing fluid.

A fourth embodiment, which is the method of one of the first through third embodiments wherein the wellbore servicing fluid further comprises a crosslinker.

A fifth embodiment, which is the method of the fourth embodiment wherein the crosslinker comprises polyvalent metal ions, aluminum ions, zirconium ions, titanium ions, antimony ions, polyvalent metal ion complexes, aluminum complexes, zirconium complexes, titanium complexes, antimony complexes, and boron compounds, borate, borax, boric acid, calcium borate, magnesium borate, borate esters, polyborates, polymer bound boronic acid, polymer bound borate, polyacrylamide bound borate, and the like, or combinations thereof.

A sixth embodiment, which is the method of one of the fourth through fifth embodiments wherein the crosslinker is present in the wellbore servicing fluid in an amount of from about 10 ppm to about 500 ppm, based on the total weight of the wellbore servicing fluid.

A seventh embodiment, which is the method of one of the first through sixth embodiments wherein the inorganic peroxide of a divalent metal M(II) characterized by the general formula $MO_2$ is sparingly soluble in water.

An eighth embodiment, which is the method of one of the first through seventh embodiments wherein the inorganic peroxide of a divalent metal M(II) comprises $MgO_2$, $CaO_2$, $ZnO_2$, $BaO_2$, and the like, or combinations thereof.

A ninth embodiment, which is the method of one of the first through eighth embodiments wherein the breaking agent is present in the wellbore servicing fluid in an amount of from about 0.1 pptg to about 50 pptg, based on the volume of the wellbore servicing fluid.

A tenth embodiment, which is the method of one of the first through ninth embodiments wherein the M(II) soluble salt comprises $MgCl_2$, $MgBr_2$, $MgI_2$, $MgSO_4$, $CaCl_2$, $CaBr_2$, $CaI_2$, $ZnCl_2$, $ZnBr_2$, $ZnI_2$, $BaCl_2$, $BaBr_2$, $BaI_2$, $SrCl_2$, $SrBr_2$, $SrI_2$; $Mg(acetate)_2$, $Mg(NO_3)_2$, $Ca(acetate)_2$, $Ca(NO_3)_2$, $Ba(acetate)_2$, $Ba(NO_3)_2$, $Sr(acetate)_2$, $Sr(NO_3)_2$, and the like, or combinations thereof.

An eleventh embodiment, which is the method of one of the first through tenth embodiments wherein the M(II) precipitating salt comprises phosphates, such as sodium phosphate, potassium phosphate, hydrogen phosphates, sodium hydrogen phosphate, potassium hydrogen phosphate, dihydrogen phosphates, sodium dihydrogen phosphate, and potassium dihydrogen phosphate; polyphosphates such as sodium polyphosphate, potassium polyphosphate, and sodium hexametaphosphate; carbonates such as sodium carbonate, and potassium carbonate; sulfates such as sodium sulfate and potassium sulfate; organic phosphates, organic phosphonates, organic carboxylates, fatty acid carboxylates, oxalates; and the like, or combinations thereof.

A twelfth embodiment, which is the method of one of the first through eleventh embodiments wherein the rate controlling additive is present in the wellbore servicing fluid in an amount of from about 1 pptg to about 200 pptg, based on the volume of the wellbore servicing fluid.

A thirteenth embodiment, which is the method of one of the first through twelfth embodiments wherein the wellbore servicing fluid is a fracturing fluid.

A fourteenth embodiment, which is the method of one of the first through thirteenth embodiments wherein the wellbore servicing fluid is a gravel packing fluid.

A fifteenth embodiment, which is a method of servicing a wellbore in a subterranean formation comprising placing a wellbore servicing fluid in the wellbore and/or the subterranean formation, wherein the wellbore servicing fluid comprises a viscosifying polymeric material, a breaking agent and a rate controlling additive; wherein the viscosifying polymeric material comprises a guar-based polymer crosslinked with a polyacrylamide bound borate crosslinker, the breaking agent comprises $MgO_2$, and the rate controlling additive comprises a Mg(II) soluble salt; allowing the wellbore servicing fluid to break; and flowing back to the surface at least a portion of the broken wellbore servicing fluid.

A sixteenth embodiment, which is the method of the fifteenth embodiment wherein the wellbore servicing fluid is a fracturing fluid further comprising a proppant.

A seventeenth embodiment, which is a method of servicing a wellbore in a subterranean formation comprising placing a wellbore servicing fluid in the wellbore and/or subterranean formation, wherein the wellbore servicing fluid comprises a viscosifying polymeric material, a breaking agent and a rate controlling additive; wherein the viscosifying polymeric material comprises a guar crosslinked with a polyacrylamide bound borate crosslinking agent, the breaking agent comprises $MgO_2$, and the rate controlling additive comprises sodium polyphosphate; allowing the wellbore servicing fluid to break; and flowing back to the surface at least a portion of the broken wellbore servicing fluid.

An eighteenth embodiment, which is the method of the seventeenth embodiment wherein the wellbore servicing fluid is a fracturing fluid further comprising a proppant.

A nineteenth embodiment, which is an aqueous based wellbore servicing fluid comprising a viscosifying polymeric material, a breaking agent comprising an inorganic peroxide of a divalent metal M(II) characterized by the general formula $MO_2$, and a rate controlling additive comprising a M(II) soluble salt, a M(II) precipitating salt, a M(II) surface precipitating salt, a M(II) solution precipitating salt, or combinations thereof.

A twentieth embodiment, which is the wellbore servicing fluid of the nineteenth embodiment further comprising a crosslinker.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the Description of Related Art is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. An aqueous based wellbore servicing fluid comprising:
   a viscosifying polymeric material;
   a breaking agent comprising an inorganic peroxide of a divalent metal M(II) characterized by the general formula $MO_2$;
   a break rate controlling additive comprising a salt selected from the group consisting of: a M(II) soluble salt, a M(II) precipitating salt, a M(II) surface precipitating salt, a M(II) solution precipitating salt, and any combination thereof; and
   a crosslinker selected from the group consisting of: a polyvalent metal ion, an aluminum ion, a zirconium ion, a titanium ion, an antimony ion, a polyvalent metal ion complex, an aluminum complex, a zirconium complex, a titanium complex, an antimony complex, a boron compound, borate, borax, boric acid, calcium borate, magnesium borate, a borate ester, a polyborate, a polymer bound boronic acid, a polymer bound borate, a polyacrylamide bound borate, and any combination thereof.

2. The wellbore servicing fluid of claim 1 wherein the viscosifying polymeric material is selected from the group consisting of: polysaccharide, a guar, a locust bean gum, a Karaya gum, a gum tragacanth, a hydroxypropyl guar, a carboxymethyl guar, a carboxymethyl hydroxypropyl guar, a hydrophobically modified guar, a high-molecular weight polysaccharide composed of mannose and galactose sugars, a heteropolysaccharide obtained by the fermentation of starch-derived sugars, xanthan, diutan, welan, gellan, scleroglucan, chitosan, dextran, a substituted galactomannan, an unsubstituted galactomannan, a starch, a cellulose, a cellulose ether, a carboxycellulose, a carboxymethyl cellulose, a hydroxyethyl cellulose, a hydroxypropyl cellulose, a carboxyalkylhydroxyethyl cellulose, carboxymethyl hydroxyethyl cellulose, methyl cellulose, polyacrylic acid, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), polyvinyl alcohol, a copolymer of acrylamide and acrylamido-2-methyl-propane sulfonate, a terpolymer of acrylamido-2-methyl-propane sulfonate, acrylamide and vinylpyrrolidone or itaconic acid, any derivative thereof, and any combination thereof.

3. The wellbore servicing fluid of claim 1 wherein the viscosifying polymeric material is present in the wellbore servicing fluid in an amount of from about 0.01 wt. % to about 15 wt. %, based on the total weight of the wellbore servicing fluid.

4. The wellbore servicing fluid of claim 1 wherein the crosslinker is present in the wellbore servicing fluid in an amount of from about 10 ppm to about 500 ppm, based on the total weight of the wellbore servicing fluid.

5. The wellbore servicing fluid of claim 1 wherein the inorganic peroxide of a divalent metal M(II) characterized by the general formula $MO_2$ is sparingly soluble in water.

6. The wellbore servicing fluid of claim 1 wherein the inorganic peroxide of a divalent metal M(II) characterized by the general formula $MO_2$ comprises a peroxide selected from the group consisting of: $MgO_2$, $CaO_2$, $ZnO_2$, $BaO_2$, and any combination thereof.

7. The wellbore servicing fluid of claim 1 wherein the breaking agent is present in the wellbore servicing fluid in an amount of from about 0.1 pptg to about 50 pptg, based on the volume of the wellbore servicing fluid.

8. The wellbore servicing fluid of claim 1 wherein the M(II) soluble salt comprises a salt selected from the group consisting of: $MgCl_2$, $MgBr_2$, $MgI_2$, $MgSO_4$, $CaCl_2$, $CaBr_2$, $CaI_2$, $ZnCl_2$, $ZnBr_2$, $ZnI_2$, $BaCl_2$, $BaBr_2$, $BaI_2$, $SrCl_2$, $SrBr_2$, $SrI_2$; $Mg(acetate)_2$, $Mg(NO_3)_2$, $Ca(acetate)_2$, $Ca(NO_3)_2$, $Ba(acetate)_2$, $Ba(NO_3)_2$, $Sr(acetate)_2$, $Sr(NO_3)_2$, and any combination thereof.

9. The wellbore servicing fluid of claim 1 wherein the M(II) precipitating salt comprises a salt selected from the group consisting of: a phosphate salt, a polyphosphate salt, a carbonate salt, a sulfate salt, an organic phosphate salt, an organic phosphonate salt, an organic carboxylate salt, a fatty acid carboxylate salt, an oxalate salt, and any combination thereof.

10. The wellbore servicing fluid of claim 1 wherein the break rate controlling additive is present in the wellbore servicing fluid in an amount of from about 1 pptg to about 200 pptg, based on the volume of the wellbore servicing fluid.

11. The wellbore servicing fluid of claim 1 wherein the wellbore servicing fluid further comprises gravel and is a gravel packing fluid.

12. The wellbore servicing fluid of claim 1 wherein the wellbore servicing fluid is a fracturing fluid further comprising a proppant.

* * * * *